(12) United States Patent
Lindholm

(10) Patent No.: US 6,345,313 B1
(45) Date of Patent: Feb. 5, 2002

(54) RECOVERY OF SYNCHRONIZATION CONSTRUCTS

(75) Inventor: Timothy G. Lindholm, Palo Alto, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/918,620

(22) Filed: Aug. 22, 1997

(51) Int. Cl.$^7$ .................................................. G06F 9/00

(52) U.S. Cl. ....................................... 709/315; 709/100

(58) Field of Search ................................. 709/100, 103, 709/104, 106, 107, 303, 400, 315, 316, 332

(56) References Cited

U.S. PATENT DOCUMENTS

| | | |
|---|---|---|
| 5,684,984 A | 11/1997 | Jones et al. |
| 5,701,470 A | 12/1997 | Joy et al. |
| 5,706,515 A | 1/1998 | Connelly et al. |
| 5,752,249 A | 5/1998 | Macon, Jr., et al. |
| 5,797,004 A | 8/1998 | Lindholm et al. .......... 395/674 |

OTHER PUBLICATIONS

Que Corporation "Special Edition Using Microsoft Internet Information",1996.*

Fiedlding et al, "Hypertext Transfer Protocol", Jul. 1996.*

* cited by examiner

Primary Examiner—Zarni Maung
(74) Attorney, Agent, or Firm—McDermott, Will & Emery

(57) ABSTRACT

A method and apparatus for managing the association of objects with synchronization constructs used to synchronize those objects with threads is described. A cache of synchronization constructs is provided. Synchronization constructs are used to synchronize objects with threads. When a thread requests synchronization with an object, a determination is made of whether a synchronization construct is already associated with the object. If a synchronization construct is already associated with the object, then that synchronization construct is used to synchronize the object with the thread. After association of a synchronization construct with an object, the association is maintained even when the synchronization construct meets termination criteria. Subsequently, a determination is made of whether a collection enabling condition exists. If a collection enabling condition exists, the association of objects with synchronization constructs that meet the termination criteria is terminated. A local table is assigned to each thread. The entries in the local table assigned to a particular thread contain information used to access a synchronization construct currently associated with an object on which the thread is or has in the past synchronized.

29 Claims, 7 Drawing Sheets

RECOVERY OF SYNCHRONIZATION CONSTRUCTS

FIELD OF THE INVENTION

The present invention relates generally to techniques for synchronizing objects with threads of execution, in particular, to techniques used to manage the dynamic associations between objects and data structures used to synchronize the objects.

BACKGROUND OF THE INVENTION

Multithreading environments allow different parts of a process, known as threads, to execute concurrently. Multithreading processes may be carefully designed so that multiple threads can execute concurrently without interfering with each other unnecessarily.

In multiprocessor computer systems, threads may run in parallel on the processors that form the multiprocessor computer system. Moreover, if a program can be broken down into constituent threads, such computer systems can run the program more quickly since concurrently running threads of the same program may execute in parallel. Single processor, multitasking computer systems can also execute multiple threads of execution virtually simultaneously through the use of various resource scheduling mechanisms well known to those skilled in the art.

When multithreading programs are object-oriented, each thread of a program may independently invoke methods of objects. However, because of software constraints in the program or hardware constraints in the computer system, only a predefined number of threads may be allowed to invoke the methods of any given object at one time.

For example, an object may contain a method that accesses a shared computer resource, such as an I/O device, that can only handle one access at a time. Since concurrently running threads may concurrently seek to invoke that method of the object, access to that method of the object must be restricted to one thread at a time. When execution of a method is restricted in this manner, the object of which this method is a member is said to be "synchronized" with the thread that currently has access to the method.

In the past, various approaches have been used to synchronize an object with a thread. These include the use of synchronization constructs like mutexes, monitors, and semaphores. One approach for the management of synchronization constructs, the dynamic-association approach, is described in U.S. patent application Ser. No. 08/569,805, entitled "OBJECT SYNCHRONIZATION MODULE AND METHOD WITH REDUCED MEMORY REQUIREMENTS", filed by Timothy G. Lindholm and Jonathan Payne on Dec. 8, 1995.

In the dynamic-association approach, synchronization constructs are associated with and disassociated with objects as needed. For example, during run-time, a thread may invoke a method of an object that requires synchronization. A synchronization construct is associated with the object if a synchronization construct is not already associated with the object. When the thread exits the method that required synchronization of the thread with the object, and there are no other threads currently requiring synchronization with the object, the synchronization construct is disassociated with the object.

Synchronization constructs are stored in a data structure referred to as synchronization construct cache. Managing the association of these synchronization constructs with objects involves the use of other data structures which are also part of, or associated with, the synchronization construct cache. A hash table links an object to its associated synchronization construct. A free list contains entries identifying the synchronization constructs that are not currently associated with any object.

Associating a synchronization construct with an object entails operations which update the synchronization construct and the synchronization construct cache. These operations include, for example, updating the synchronization construct with information linking the synchronization construct to the object, creating an entry in the hash table linking the object to the synchronization construct, and removing the synchronization construct from the free list. Likewise, terminating the association of a synchronization construct with an object includes operations such as removing an entry in the hash table linking the object to the synchronization construct, and adding the synchronization construct to the free list.

It is very common in multitasking computer systems for one or more threads to repeatedly invoke a method of the same object. When a repeatedly invoked method of an object requires synchronization, the operations involved in the association and disassociation of the synchronization construct with the object are likewise repeated. The repeated performance of the operations involved in associating and terminating the association of a synchronization construct with an object can create an undesirable amount of overhead that adversely impacts overall computer system performance.

The operations involved in associating and terminating the association of synclronization constructs perform updates to data structures (i.e. the hash table, synchronization construct, and free list) in the synchronization construct cache. Because the synchronization construct cache is shared by all threads, the data structure representing the synchronization construct cache is a global data structure. A reference or an update to a data structure in the synchronization construct cache may require a lock of the global data structure representing the synchronization construct cache to prevent interference to and from other concurrently executing threads that may also desire to update the data structure. A lock of a global data structure is herein referred to as a global lock. Because the synchronization construct cache is a global data structure, it may be referred to as the global synchronization construct cache.

A thread contending for a data structure globally locked by another thread is delayed until the other thread releases its global lock. Delays such as this one, which are caused by one thread contending for a data structure locked by another thread, are herein referred to as contention delays.

As threads executing in a computer system increase the number of operations performing updates on global data structures, or the number of threads increases, contention delays can often increase to undesirable levels. Thus frequently repeated associations and termination of associations of synchronization constructs, which involve operations performing updates on data structures in the global synchronization construct cache, can cause contention delays to reach undesirable levels.

Based on the foregoing, it clearly desirable to reduce the amount of overhead caused by frequently repeated associations and termination of associations of synchronization constructs. It is further desirable to reduce contention delays caused by frequently repeated associations and termination of associations of synchronization constructs with objects.

SUMMARY OF THE INVENTION

A method and apparatus for managing the association of objects with synchronization constructs used to synchronize those objects is provided. According to one aspect of the invention, a cache of synchronization constructs is provided. Synchronization constructs are used to synchronize objects with threads. When a thread requests synchronization with an object, a determination is made of whether a synchronization construct is already associated with the object. If a synchronization construct is already associated with the object, then that synchronization construct is used to synchronize the object with the thread. After association of a synchronization construct with an object, the association is maintained even when the synchronization construct meets criteria for terminating the association with object.

According to another aspect of the invention, a determination is made of whether a collection enabling condition exists. If a collection enabling condition exists, the association between objects and synchronization constructs is terminated for synchronization constructs meeting criteria for terminating the association between a synchronization construct and an object.

According to another aspect of the invention, a local table is assigned to each thread. The entries in the local table assigned to a particular thread contain information used to access a synchronization construct currently associated with an object on which the thread is or has in the past synchronized. To determine whether an object is currently associated with a synchronization construct, information in the local table entry associated with the object is used to search for a synchronization construct. When determining whether a synchronization construct is associated with an object, information identifying the object is stored in an in-progress indicator associated with the thread. When an object is identified by information in an in-progress reference, the object's association with a synchronization construct is not terminated should a collection enabling condition occur.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for managing the association of objects with synchronization constructs used to synchronize those objects with threads is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
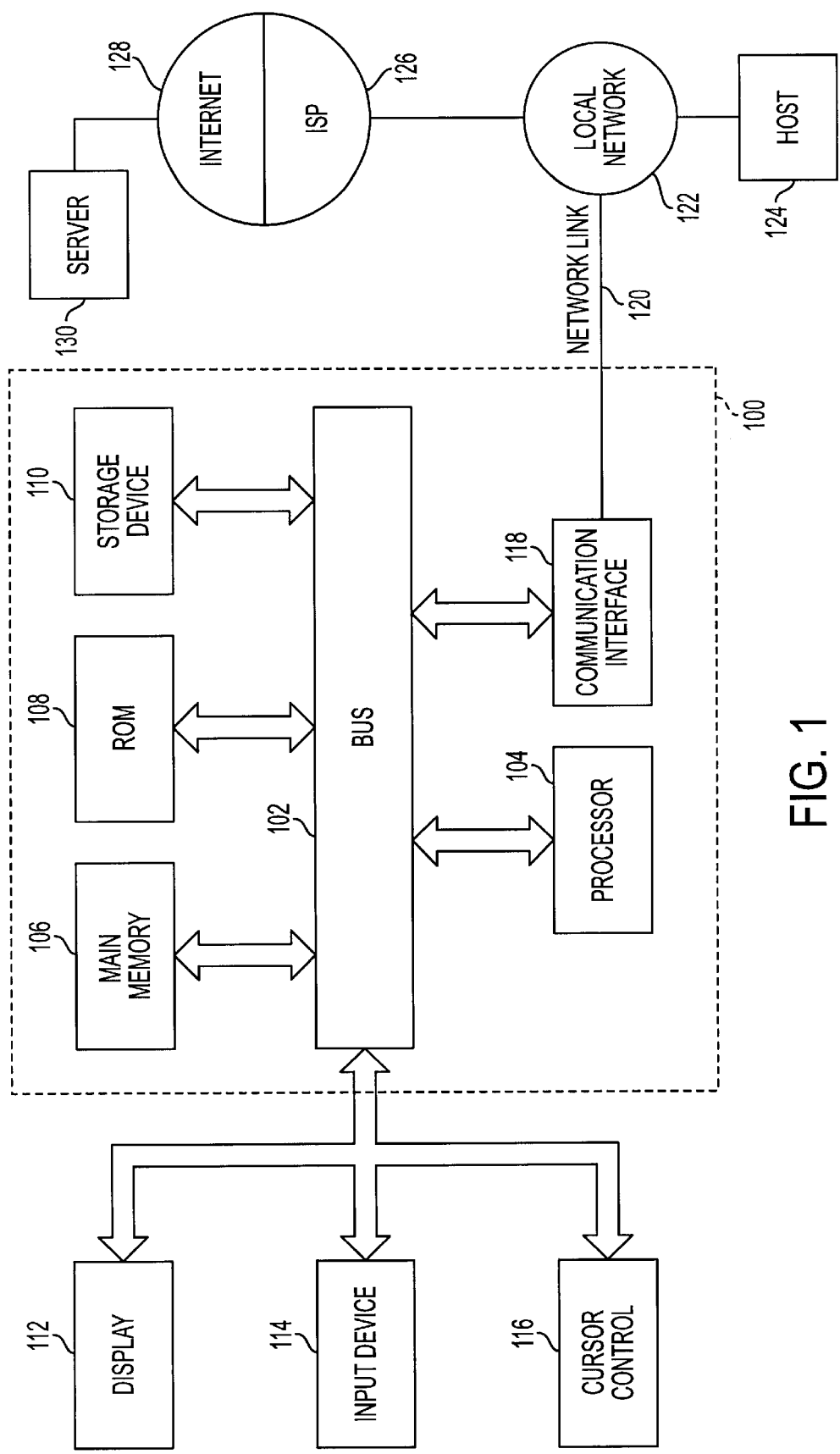
FIG. 1 is a block diagram of a computer system on which the present invention may be implemented.

Referring to FIG. 1, it is a block diagram of a computer system 100 upon which an embodiment of the present invention can be implemented. Computer system 100 includes a bus 102 or other communication mechanism for communicating information, and a processor 104 coupled with bus 102 for processing information. Processor 104 generally represents one or more processors capable of executing instructions that conform to a particular instruction set. Computer system 100 further comprises a random access memory (RAM) or other dynamic storage device 106 (referred to as main memory), coupled to bus 102 for storing information and instructions to be executed by processor 104. Main memory 106 also may be used for storing temporary variables or other intermediate information during execution of instructions by processor 104. Computer system 100 also comprises a read only memory (ROM) and/or other static storage device 110 coupled to bus 102 for storing static information and instructions for processor 104. Data storage device 110 is coupled to bus 102 for storing information and instructions.

A data storage device 110 such as a magnetic disk or optical disk and its corresponding disk drive can be coupled to computer system 100. Computer system 100 can also be coupled via bus 102 to a display device 112, such as a cathode ray tube (CRT), for displaying information to a computer user. Computer system 100 further includes an input device 114, such as a keyboard, and a cursor control 116, such as a mouse.

The present invention is related to the use of computer system 100 to manage the association of objects with synchronization constructs used to synchronize those objects with threads. According to one embodiment, managing the association of objects with synchronization constructs used to synchronize those objects with threads is performed by computer system 100 in response to processor 104 executing sequences of instructions contained in memory 106. Such instructions may be read into memory 106 from another computer-readable medium, such as data storage device 110. Execution of the sequences of instructions contained in memory 106 causes processor 104 to perform the process steps that will be described hereafter. Computer system 100 is capable of executing instructions in object-oriented multithreaded software programs stored in memory 104.

Computer 100 also includes a communication interface 118 coupled to bus 102. Communication interface 118 provides a two-way data communication coupling to a network link 120 to a local network 122. For example, if communication interface 118 is an integrated services digital network (ISDN) card or a modem, communication interface 118 provides a data communication connection to the corresponding type of telephone line. If communication interface 118 is a local area network (LAN) card, communication interface 118 provides a data communication connection to a compatible LAN. Wireless links are also possible. In any such implementation, communication interface 118 sends and receives electrical, electromagnetic or optical signals which carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer 100 are exemplary forms of carrier waves transporting the information.

Computer 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer 100 may obtain application code in the form of a carrier wave.

In alternative embodiments, hard-wired circuitry may be used in place of or in combination with software instructions to implement the present invention. Thus, the present invention is not limited to any specific combination of hardware circuitry and software.

FUNCTIONAL OVERVIEW

The mechanisms described herein are intended to manage the dynamic association between objects and a broad category of synchronization constructs (e.g. mutexes, monitors, semaphores) that are used to synchronize and desynchronize objects. Beyond those operations involved in synchronizing and de-synchronizing, operations specifically pertaining to the type of synchronization construct may also require the mechanism for managing the association of synchronization constructs with objects.

The mechanisms described herein for managing the association of synchronization constructs with objects operate upon synchronization constructs that each remain, for a period of time, associated with an object even when the synchronization construct is not "in-use". A synchronization construct is referred to as being in-use when its current association with an object is necessary for the proper functioning of some operation related to the use of the synchronization construct. For example, a synchronization construct is "in-use" when the synchronization construct is being used to synchronize a thread with an object. A synchronization construct that for a time is associated with an object in this manner may eventually be made available for operations with another object through a process referred to herein as garbage collection.

The process of garbage collection is the mechanism that terminates the association of a synchronization construct with an object. When the synchronization construct's association with an object is terminated during garbage collection, the synchronization construct is made available for operations involving another object. A synchronization construct's association with an object is terminated during garbage collection when the synchronization construct is not in-use.

One aspect of garbage collection involves determining whether a synchronization construct is in-use. This determination will vary according to the type of synchronization construct used. Each type of synchronization construct is associated with a different set of data structures. The state of these data structures indicates whether synchronization construct is still in-use.

Termination criteria is used to establish whether a synchronization construct is in-use. When a synchronization construct meets the termination criteria, its association with an object can be terminated. Termination criteria can include criterion such as no thread is synchronized with the object and that no thread is waiting for synchronization with the object. Termination criteria is based, in part, on the state of data structures associated with the synchronization constructs. As such, the termination criteria varies according to the type synchronization being used.

For purposes of exposition, the methods described herein are illustrated with reference to an exemplary set of data structures associated with synchronization constructs that indicate whether a synchronization construct is in-use. In addition to these data structures, the steps for synchronizing, desynchronizing, and other operations specific to the type of synchronization construct are explained only in the detail necessary to the understanding of the mechanism described herein for managing the dynamic association of synchronization constructs with objects. Those skilled in the art will recognize when the determination of the in-use state of the synchronization construct and when the operations specific to a given type of synchronization construct vary according to the type of synchronization construct being used.

Figure 2:
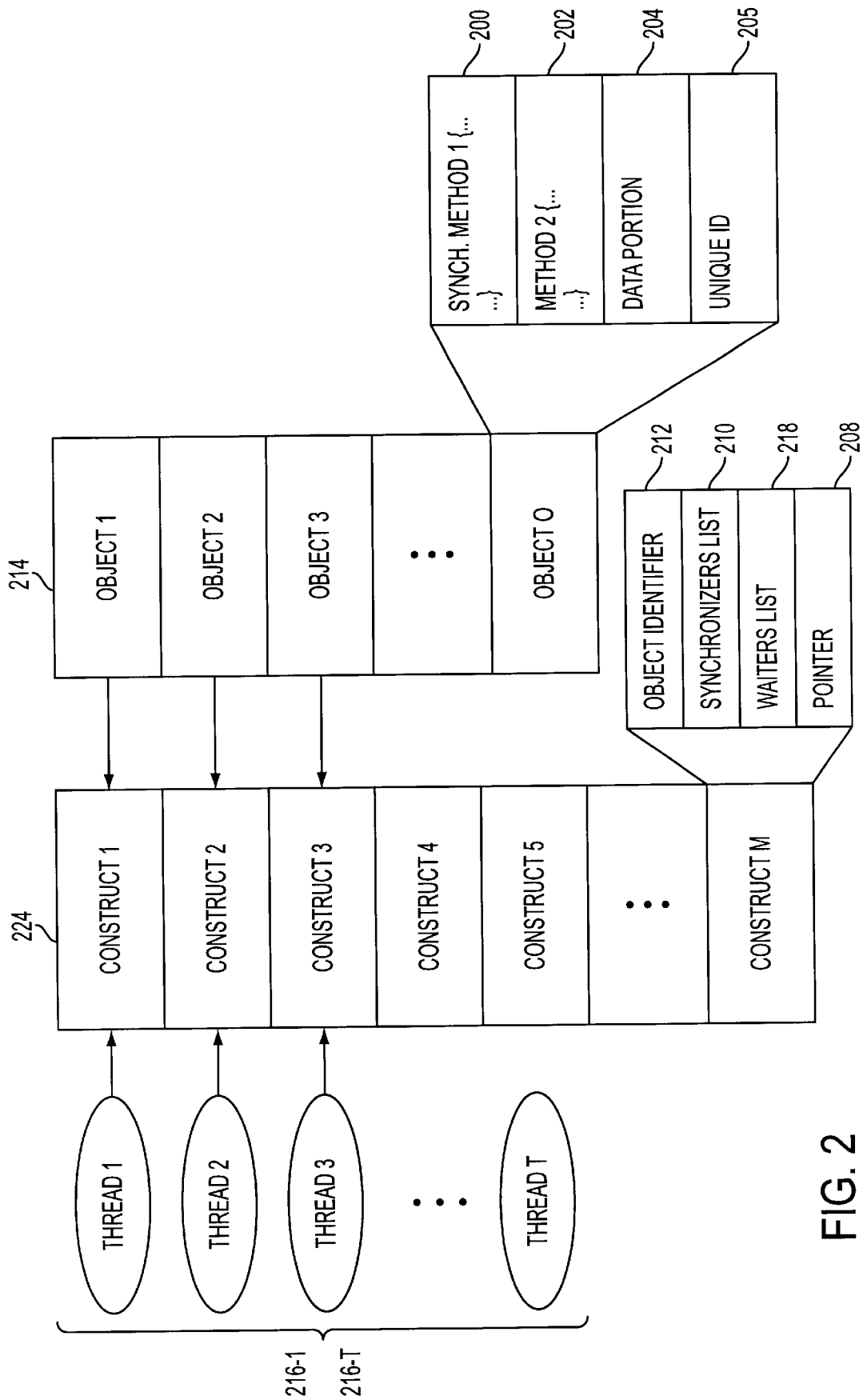
FIG. 2 is a block diagram of objects, threads, and synchronization constructs used by an object synchronization module to synchronize the threads with objects.

Referring to FIG. 2, memory 106 stores a set of objects 214. Each of objects 214 may include zero or more methods and a data portion, or zero or more methods with no data portion. For example, Object O includes one synchronized method 200, a method 202 that is not synchronized, and a data portion 204. Data portion 204 contains data and data structures associated with the Object O.

Each of the objects 214 is associated with an unique ID 205. The generation of unique IDs that are associated with an object is well known to those skilled in the art.

For purposes of illustration, the objects 214 shown in FIG. 2 are generated by a Java™ virtual machine running on computer system 100 executing byte code. The Java™ virtual machine is described in detail in "The Java™ Virtual Machine Specification," by Tim Lindholm and Frank Yellin (Sun Microsystems, Inc.: Addison-Wesley Publishing Co.). The byte code is generated from source code written in Java™ using well known compilation techniques. The Java™ programming language is described in detail in "The Java™ Language Specification," by James Gosling, Bill Joy and Guy Steele (Sun Microsystems, Inc.: Addison-Wesley Publishing Co.), and related texts in the Java™ Series published by Addison-Wesley.

Those skilled in the art will recognize that the methods described herein for managing the association of objects with the synchronization constructs used to synchronize those objects apply to objects implemented in any programming language or environment. Therefore the present invention is not limited to objects implemented in any particular programming language.

One synchronized method of the one or more synchronized methods associated with any particular object can be accessed by only a predefined number of threads at a time executing on computer system 100. The pre-defined number of threads that may be synchronized is assumed herein to be one. But, those skilled in the art will recognize that the methods described herein may be used to synchronize an object with more than one thread.

Synchronized methods may be explicitly declared synchronized by the object originator (i.e., programmer). When a synchronized method is invoked by a thread, the object of which that method is a member will be synchronized with that thread until the invocation of the method is terminated.

Moreover, some of the objects 214 include one or more methods 202 and associated data and data structures in the data portion 204 that may be executed concurrently, without the need for synchronization, by one or more of threads 216. Thus, these methods are not synchronized and will not have been declared synchronized by the object originator.

Some of the objects 214 may contain both synchronized and non-synchronized methods 200 and 202. When one of the threads 216 invokes a method of such an object, the object is not synchronized with the thread when one of its non-synchronized methods is invoked. As a result, it will often be the case that a non-synchronized method may be executed concurrently by more than one of the threads 216, and may be executed concurrently with any number of other non-synchronized methods of the object, or concurrently with a synchronized method of the object.

Beyond having a synchronized method, there are other situations in which a thread must synchronize with an object. For example, some of the objects 214 may include methods in which only certain specific blocks of code are explicitly declared synchronized with a specified object so that the specified object will be synchronized with the thread executing this block.

While several syntactical variants for declaring sections of code, e.g. methods and blocks, synchronized have been described, other syntactical variants are possible. Moreover, in some programming languages or operating environments, a method may be synchronized without explicitly declaring the method synchronized. Therefore, it is understood that the present invention is not limited to any particular method of identifying synchronized methods.

Class methods may also be declared synchronized. A class method is invoked on behalf of the entire class, and not on behalf of a specific object belonging to that class. All threads invoking a class method declared synchronized must synchronize with the class, rather than a specific object belonging to that class.

For purposes of illustration, only synchronization of an object that includes a method that is declared synchronized will be discussed with respect to the present invention. However, the present invention is applicable as well to objects or classes that are synchronized in other ways, and are identified as synchronized, including those ways just discussed. Furthermore, those skilled in the art will recognize that the present invention is applicable to data structures used by other locking mechanisms, including locking mechanisms implemented for non-object oriented programming.

EXEMPLARY OBJECT SYNCHRONIZATION MODULE

Figure 3:
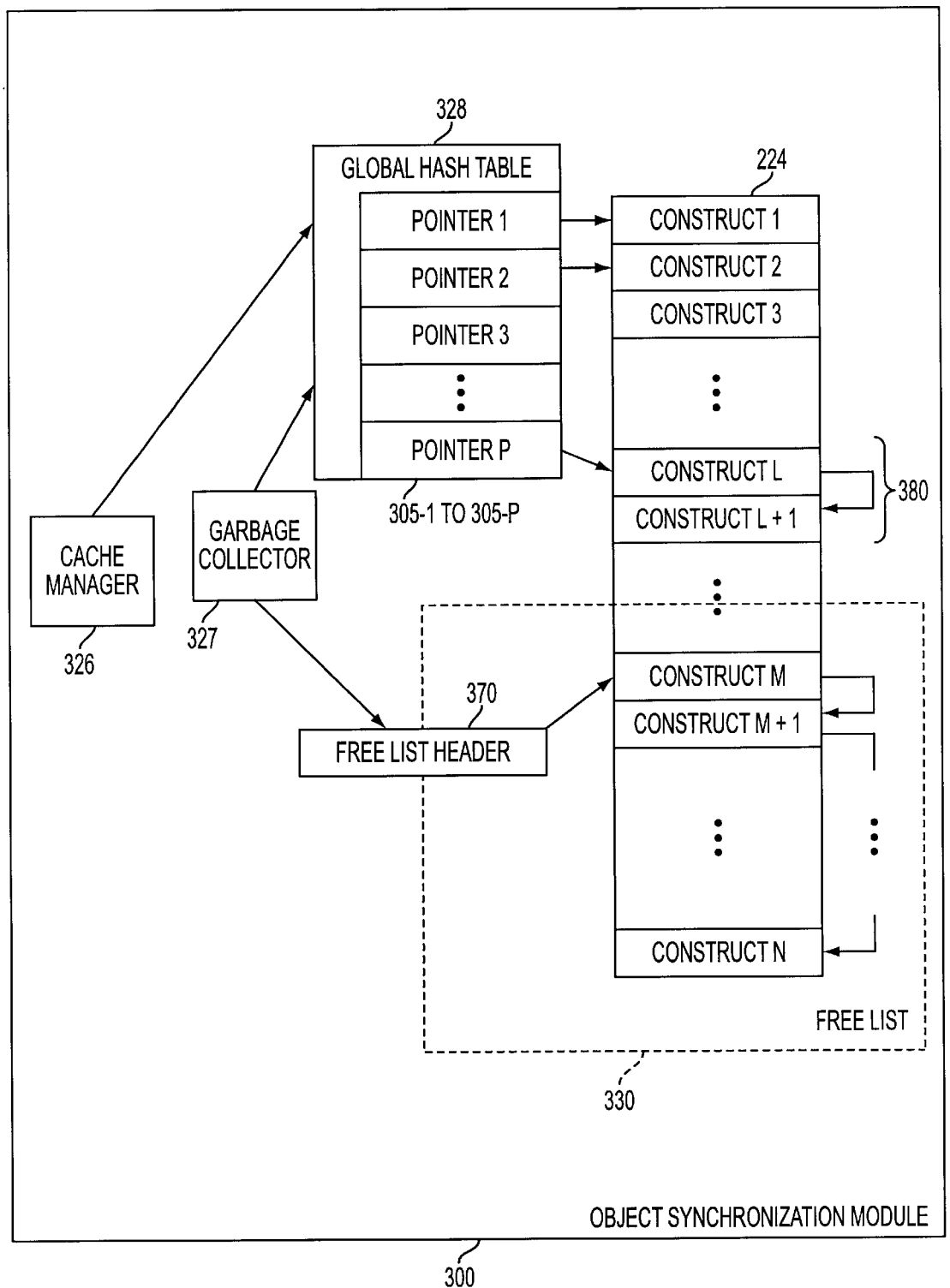
FIG. 3 is a block diagram showing modules used by the object synchronization module and the data structures used by the object synchronization module.

Referring to FIG. 3, in order to manage the association between synchronization constructs and objects 214, an object synchronization module 300 is provided. The object synchronization module includes a cache of object synchronization constructs 224, a cache manager 326, a garbage collector 327, a global hash table 328, and a synchronization construct free list 370. Global hash table 328 and free list 370 are global data structures which must be globally locked against concurrent access before being accessed by a thread.

Referring to FIG. 2, constructs 224 are synchronization constructs used to synchronize objects 214 with threads 216. An object is associated with one synchronization construct to synchronize the object with a thread. A synchronization construct is not associated with an object until a thread requests synchronization with the object. Afterwards, the synchronization construct may remain associated with the object until the synchronization construct's association with the object is terminated in a manner which shall be described.

For purposes of exposition, each of the synchronization constructs 224 includes an exemplary synchronizers (or owner) list 210, and an exemplary waiters list 218. The exemplary synchronizers list 210 lists the thread that is currently synchronized with (or owns) the object. The exemplary waiters list 218 lists all the threads that are currently waiting to synchronize with the object to which the synchronization construct is associated.

The exemplary synchronizers list 210 and exemplary waiting list 218 are intended for illustrative purposes and not meant to be representative of an actual implementation of data structures specifically used to synchronize an object. The exemplary synchronizers list 210 and exemplary waiters list 218 are provided merely as illustrative data structures which are used by operations specific to the exemplary synchronizing and de-synchronizing described below. Furthermore, these illustrative data structures are used to provide an illustration of how data structures specific to synchronizing or desynchronizing may be used to determine whether a synchronization construct meets termination criteria. Those skilled in the art will recognize how data structures specific to a particular type of synchronization construct can be used to determine whether termination criteria is met.

Each synchronization construct also includes an object identifier 212. The object identifier 212 is set to the unique ID of the object associated with a synchronization construct.

Referring to FIG. 3, the global hash table 328 contains a set of pointers 305. Each pointer is at a global hash table address. Each of the objects 214 that are to be synchronized is mapped to a corresponding address in the global hash table. This is done by computing a predetermined hash function on the unique IDs of these objects to generate the corresponding global hash table addresses. In order to keep the size of the synchronization construct cache in the memory small, the number of pointers 305 and the number of synchronization constructs 224 is less than the number of objects. However, the number of pointers 305 and the number of synchronization constructs 224 can be increased if necessary.

Because multiple unique IDs may be mapped by the global hash table function to the same global hash table address, multiple objects may be mapped to the same global hash table address. In order to properly map multiple objects to the same global hash table address, a chain of constructs is provided for each global hash table address. A chain of constructs is a singly-linked list that contains zero or more synchronization constructs that are currently associated with objects whose unique IDs map to the same global hash table address. The pointer at a particular global hash table address is used to refer to the chain of constructs that contains the synchronization constructs currently associated with objects whose unique IDs map to the particular global hash table address. The manner in which the pointer refers to a chain of constructs shall be described in more detail.

A singly-linked list is a data structure that is a list representation of items in the list. Singly-linked lists, and methods used to access them and maintain them, such as methods for adding items and removing items to the singly-linked list, are well known to those skilled in the art.

Each pointer of pointers 305 illustrated in FIG. 3 serves as a list reference to a singly-linked list which is a chain of zero or more constructs. For example, pointer P in FIG. 3, is a list reference referring to the first item (construct 224-L) in an exemplary chain of constructs 380. A pointer that is referring to a data structure is herein referred to as a pointer pointing to the data structure. Typically, pointers contain memory addresses of the data structures to which the pointers point, and are used to access the data structures to which the pointer points.

While one method for referring to a synchronization construct has been described, various alternative methods for referring to a synchronization construct are possible. Therefore, it is understood that the present invention is not limited to a particular method for referring to a data structure. For example, Pointer M in FIG. 3 may point to a handle for a synchronization construct. The handle itself may contain a pointer to the synchronization construct.

Furthermore, those skilled in the art will recognize that mechanisms or data structures other than global hash table 328 may be used to map an object to the synchronization construct associated with the object. Therefore, it is understood that the present invention is not limited to any particular mechanism for mapping an object to the synchronization construct associated with the object.

EXEMPLARY SYNCHRONIZATION

An exemplary method of synchronization shall now be described with reference to FIG. 2 and FIG. 3. Referring to FIG. 2, assume for example that thread 216-T invokes a synchronized method of object 214-O. Thread 216-T requests synchronization with object 214-O by invoking object synchronization module 300. In invoking the object synchronization module 300, the object synchronization module 300 is instructed that thread 216-T is attempting to invoke a synchronized method of the object 214-O and is requesting synchronization. The object synchronization module 300 then invokes cache manager 326.

Cache manager 326 begins by determining which synchronization construct is currently associated with object 214-O, if any. First, cache manager 326 generates the global hash table address to which the object's unique ID is mapped. It does so by computing the predetermined hash function on the unique ID. The cache manager 326 then locks the global hash table 328 and locates the pointer in the pointers 305 that is at the generated global hash table address. Then cache manager 326 determines whether the chain of constructs pointed to by the located pointer, chain of constructs 380 in this example, contains a synchronization construct currently associated with the object 214-O. The cache manager 326 makes this determination by accessing each of the synchronization constructs in chain of constructs 380 to determine whether the object identifier 212 of the synchronization construct being accessed corresponds to object 214-O, stopping if the sought after synchronization construct is found.

If chain of constructs 308 does not contain a synchronization construct with an object identifier 212 identifying object 214-O, as is the case in this example, then object 214-O is not currently associated with a synchronization construct. As a result, the object synchronization module 300 then associates a synchronization construct 224-N that is taken from the free list 370 with the object 214-O.

The free list 370 is a singly-linked list of those of the synchronization constructs 224, in this case synchronization constructs 224-N to 202-M, that are not currently associated with an object. It comprises a free list header 206 and a pointer 208 which is the list reference for free list 370. When a synchronization construct is taken from the free list 370 and associated with an object, the free list 370 is first locked, then updated to reflect that the synchronization construct is removed from free list 370 and added to the chain of constructs pointed to by the located pointer. The free list 370 is then unlocked. In associating a synchronization construct 224 from the free list 370 with object 214-O for synchronizing object 214-O, the object synchronization module 300 updates the associated synchronization construct's object identifier to the object's unique ID to uniquely identify the object. Now that the operations specifically pertaining to associating synchronization construct 224-N with object 214-O are complete, the global hash table 328 may be unlocked.

The object synchronization module 300 then performs the operations necessary to synchronize object 214-O with thread 216-T. These operations include adding an entry for thread 216-T to the associated synchronization construct's exemplary synchronizers list 210.

Sometimes a synchronization construct is already associated with the object with which a thread is requesting synchronization. Assume, for example, that object 214-O is associated with a synchronization construct, and that thread 216-T is requesting synchronization with object 214-O. Cache manager 326 uses global hash table 328 to determine the chain of constructs that may include the synchronization construct associated with object 214-O, which is chain of constructs 380, and searches for the synchronization constructs in chain of constructs 380 in the same manner as described before. When the cache manager 326 accesses the synchronization construct associated with object 214-O, cache manager 326 then determines that object identifier 212 of the synchronization construct associated with object 214-O identifies object 214-O. Now that the operations specifically pertaining to verifying the association of synchronization construct 224-N with subject 214-O are complete, the global hash table 328 may be unlocked.

Then the object synchronization module begins performance of those operations necessary to synchronize object 214-O with thread 216-T. These operations include first determining whether the exemplary synchronizers list 210 of the synchronization construct associated with object 214-O contains an entry for a thread. If the exemplary synchronizers list does not contain an entry, then an entry for thread 216-T is added to the exemplary synchronizers list. At this point the object 214-O is synchronized with thread 216-T. Thread 216-T begins execution of the synchronized method 200 of object 214-O that thread 216-T previously invoked.

If, on the other hand, the exemplary synchronizers list contains an entry for a thread, and it is not thread 216-T, the thread requesting synchronization, an entry for thread 216-T is added to exemplary waiters list 218. In the future, the entry for thread 216-T will be removed from the exemplary waiters list 218 when it is later synchronized with object 214-O in a manner which shall be described in more detail.

DE-SYNCHRONIZATION OF OBJECTS WHEN SYNCHRONIZATION IS COMPLETED

When one of threads 216 exits a synchronized method 200 of one of the objects 214, this particular synchronization of the object with the thread may be completed. For purposes of illustration, it herein assumed that synchronization with objects are not nested. When synchronization with objects do nest, nesting would occur when, for example, an object becomes synchronized by first invoking a synchronized method of an object, and then subsequently invoking one or more synchronized methods of the same object before the first invocation is terminated. The object remains synchronized with the thread until each of the subsequent invocations of the synchronized methods and the first invocation is terminated. Regardless of whether synchronization with objects nest or not, after a thread desynchronizes with an object, the object and its associated synchronization construct remain associated, until the association is terminated by garbage collection in manner which shall be described.

Figure 4:
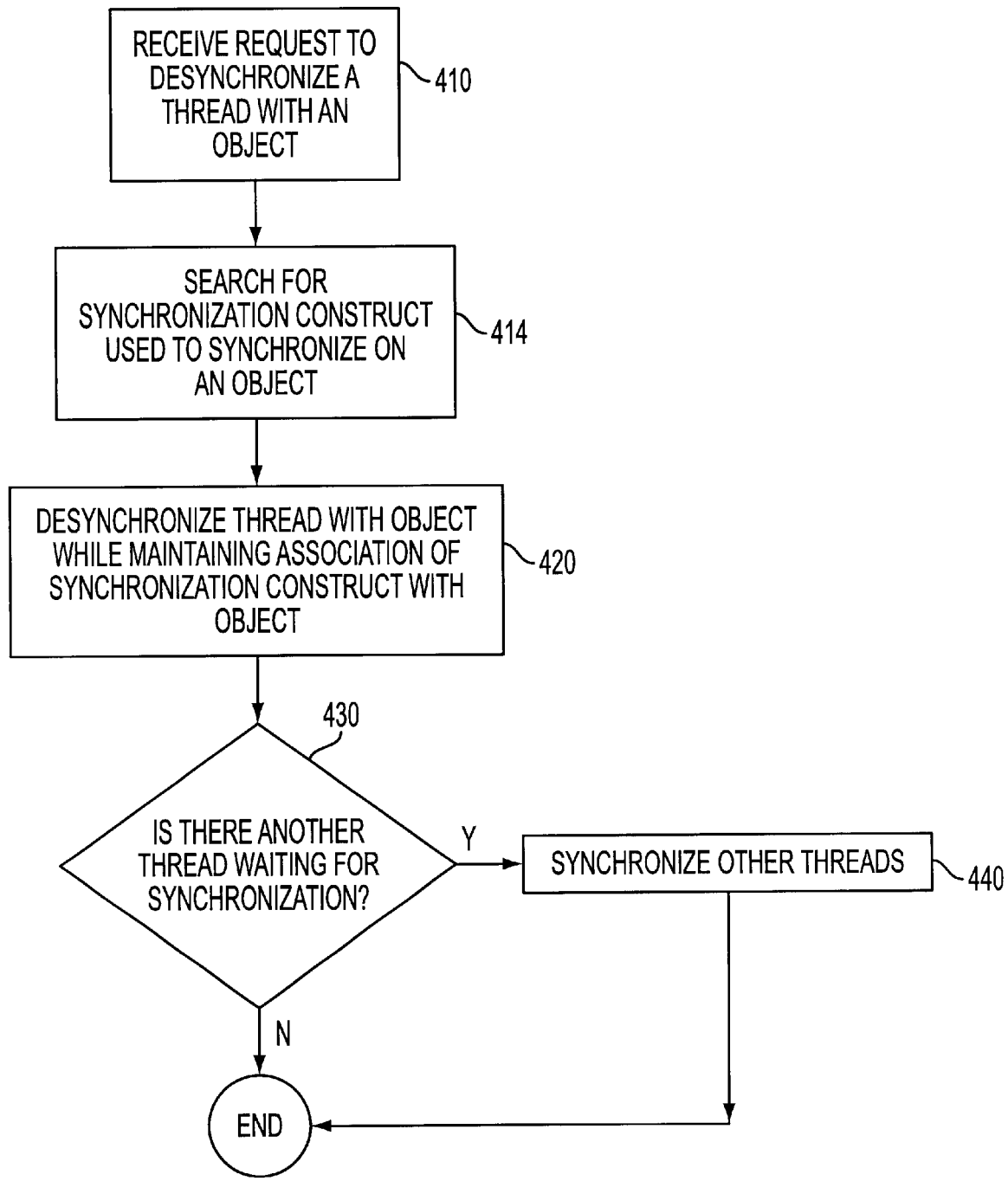
FIG. 4 is a flow chart showing a method to de-synchronize a thread from an object.

In the current example, thread 216-T invokes the object synchronization module 300 to instinct the object synchronization module 300 that the thread is requesting to de-synchronize with the object whose synchronized method the requesting thread is exiting. In response, the steps shown in FIG. 4 are performed.

Assume for example, thread 216-1 is synchronized with object 214-1, and is exiting a synchronized method 200 of object 214-1 when thread 216-1 invokes object synchronization module 300 and instructs object synchronization module 300 that thread 216-1 requests de-synchronization with object 214-1. Referring to FIG. 4, in step 410, object synchronization module 300 receives the request from thread 216-1 that thread 216-1 requests de-synchronization with object 214-1.

In step 414, cache manager 326 finds the synchronization construct associated with the object from which the requesting thread requests de-synchronization. In this example, in the same manner previously described, cache manager 326 generates a global hash table address based on object's 214-1 unique ID, locks the global hash table 328, and uses the pointer stored at this global hash table address to access the chain of constructs that contains the synchronization construct associated with object 214-1. The unique ID of object 214-1 maps to pointer 305-1, which points to construct 224-1, the synchronization construct used to synchronize on object 214-1. Then global hash table 328 is unlocked.

In step 420, object synchronization module 300 begins performance of the operations necessary to de-synchronize the requesting thread from the object from which the requesting thread requests de-synchronization. These operations include removing the thread from the exemplary synchronizers list 210 of the synchronization construct found in step 414. In this example, thread 216-1 is removed from the exemplary synchronizers list 210 of synchronization construct 224-1.

At step 430, a determination is made of whether there is another thread requiring synchronization. This determination is made by examining the exemplary waiters list 218 of the synchronization construct found in step 414 to see whether an entry for a thread is in the exemplary waiters list 218. If there is an entry for a thread in the exemplary waiters list 218, then control flows to step 440. Otherwise, execution of the steps ceases.

In this example, the exemplary waiters list 218 of object 214-1 is examined to determine whether it contains a thread awaiting synchronization with this object. In this example, no thread is on the exemplary waiters list 218 of object 214-1, so execution of the steps in FIG. 4 ends.

At step 440, the entry for a thread on the exemplary waiters list 218 of the synchronization construct found in step 414 is removed and an entry for this thread is added to the exemplary synchronizers list 210 of the found synchronization construct. The thread with the entry just added to the exemplary synchronizers list may then begin execution of its synchronized method of the object with which the found synchronization construct is associated. Note that after desynchronization, the found synchronization construct remains associated with its respective object.

GARBAGE COLLECTION

Figure 5:
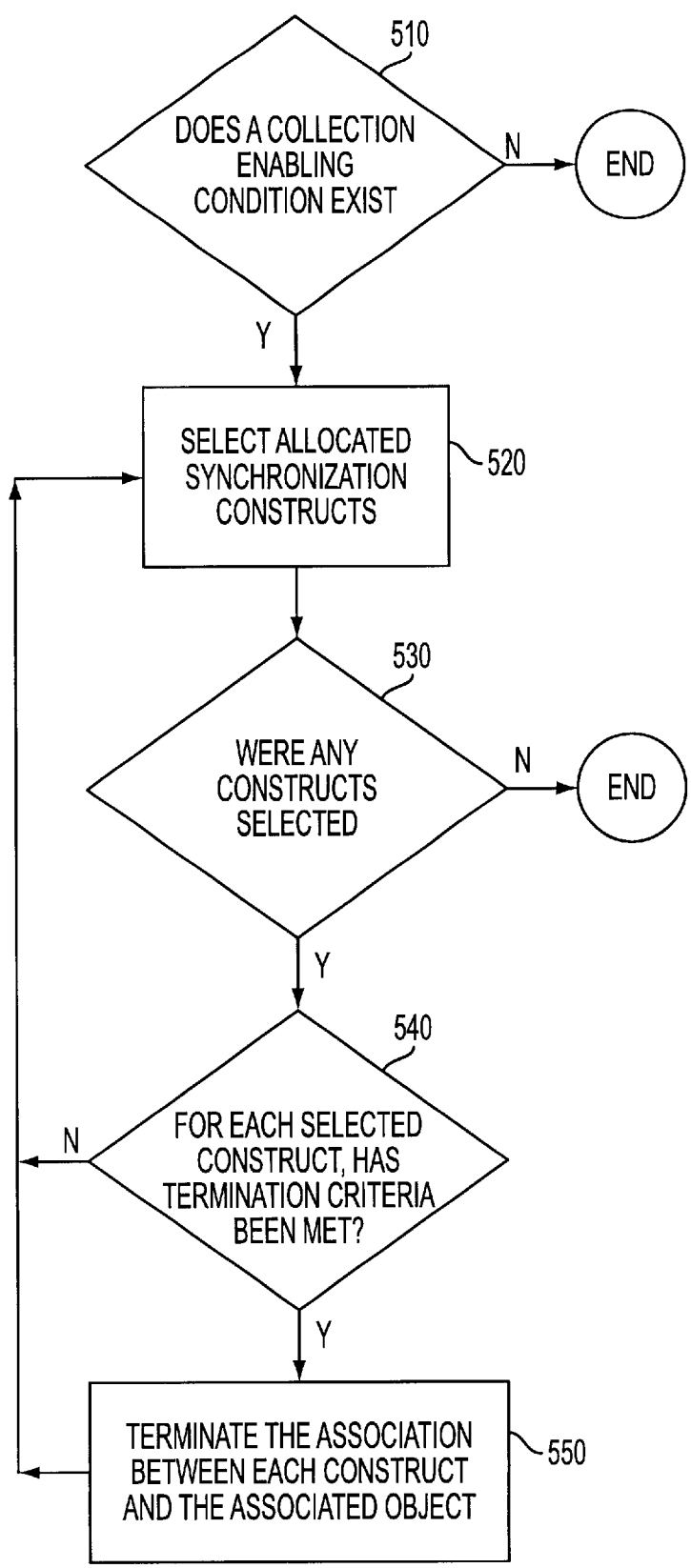
FIG. 5 is a flow chart showing a method to terminate associations of objects with synchronization constructs.

Garbage collection is the mechanism by which synchronization constructs that are currently associated with objects but that meet termination criteria are made available for association with other objects. When a synchronization construct is made available for association, the synchronization construct is referred to as being freed. FIG. 5 shows the steps for performing garbage collection according to an embodiment of the invention.

Referring to FIG. 5, in step 510, garbage collector 327 is invoked by object synchronization module 300 in response to object synchronization module 300 detecting a garbage collection enabling condition. A garbage collection enabling condition may include, for example, the free list 370 containing less than a threshold number of synchronization constructs. When this condition occurs, the object synchronization module 300 then invokes garbage collector 327 to free those synchronization constructs that meet the termination criteria.

While one garbage collection enabling condition has been described above, various alternative conditions occur. Therefore, it is understood that the present invention is not limited to any specific garbage collection enabling condition.

In step 520 of FIG. 5, the garbage collector 327 locks the free list 330 and global hash table 328. Synchronization constructs are then selected by repeatedly selecting each table address in global hash table 328, and then repeatedly selecting each synchronization construct in the chain of constructs pointed to by the pointer at the selected global hash table address. Assume, for example, that the first selected synchronization construct is construct 224-1, and that thread 216-1 has been de-synchronized from object 214-1 in the manner previously described. Further, assume that synchronization construct 224-1 remains associated with object 214-1 despite the fact that it is not being used to synchronize object 224-1 and there are no threads waiting to synchronize the object.

In step 530, a determination is made of whether any synchronization constructs were selected in step 530. If no synchronization constructs were selected in step 530, then the free list 330 and global hash table 328 are unlocked, and execution of the steps would cease. Otherwise control passes to step 540, as in this example.

In step 540, a determination is made of whether association termination criteria, for each selected construct, has been met. In one embodiment of the invention, termination criteria include a criterion that no thread is synchronized with the object associated with the synchronization construct and no thread is waiting for synchronization with the object. While one set of termination criteria has been described, termination criteria can be comprised of other criteria. Therefore, it is understood that the present invention is not limited to any specific termination criteria.

Whether a thread is synchronized with an object is determined by examining the exemplary synchronizers list 210 of the selected synchronization construct. If the exemplary synchronizers list 210 contains an entry for a thread, then the object to which the synchronization construct is associated is synchronized with a thread. In this case, control returns to step 520.

If however the respective exemplary synchronizers list 210 contains no thread, then the object to which the synchronization construct is associated is not synchronized with any thread. In this case, it is then determined whether any thread is waiting for synchronization with the object. Whether a thread is waiting for synchronization is determined by examining the exemplary waiters list 218. If the list contains an entry for at least one thread, then there is a thread waiting for synchronization with the object. Therefore, control passes to step 520. Otherwise, control passes to step 550.

In this example, since there is no entry for any thread in the exemplary synchronizers list for object 214-1, control returns to step 520.

In step 550, the association of the selected synchronization construct with the object is terminated. The selected synchronization construct is removed from the chain of constructs to which it currently belongs, and is added to free list 370.

The association of synchronization constructs with objects is only terminated by the garbage collector 327. As mentioned earlier, when a thread requests desynchronization with an object, the synchronization construct remains associated with the object, even when no other threads are synchronized with the object or are currently awaiting synchronization (i.e. are on the exemplary waiters list). One consequence of not terminating the association of a synchronization construct is that the synchronization construct often is already associated with an object the next time a thread requests synchronization with that object. As compared to a method of de-synchronizing an object with a thread that always terminates the association of the synchronization construct with its associated object when no threads remain synchronized with or are waiting for synchronization with the object, the number of associations and termination of associations that need to be performed is reduced.

Reducing the number of associations and termination of associations of synchronization constructs with objects reduces the overhead incurred when performing the operations involved in associating and terminating the association of synchronization constructs with objects, such as removing and adding a synchronization construct to the free list and adding and removing a synchronization construct to the chain of constructs. Because the free list and global hash table are globally locked when accessed and updated, the number global locks is decreased, thereby reducing contention delays.

ADDITIONAL FEATURES AND ALTERNATIVE EMBODIMENTS

One embodiment of the invention has been described as utilizing synchronization constructs 224 for synchronizing objects 214 with threads 216. These synchronization constructs may be well known synchronization constructs such as mutexes, monitors, and semaphores.

In the case where the synchronization constructs 224 are mutexes, the mutexes may simply operate in the way described earlier without any additional synchronization features. Moreover, the predefined number of threads 216 that can be synchronized with one of the objects 214 at a time may be one. Moreover, there may also be any number of threads waiting for synchronization.

However, when the synchronization constructs 224 are monitors, they may additionally include a condition variable waiters list (not to be confused with exemplary waiters list 218). The condition variable waiters list of a monitor contains those of the threads 216 that have ceased their synchronization with the object that has its synchronization monitored by the monitor, pending some condition being true. When the waiting thread is notified by another thread, the waiting thread is unsuspended. Then the thread first reacquires the monitor lock, and normally rechecks whether the condition is true. Note that the association termination criteria for synchronization constructs that are monitors would include that no object be on the condition variable waiters list.

In the case where the synchronization constructs 224 are semaphores, the predefined number of threads 216 that may be synchronized with one of the objects 214 at one time may be some positive number N. As a result, up to N threads may be listed in the exemplary synchronizers list 210 representing the N threads on which the object is currently synchronized.

THREAD-LOCAL CACHE

Figure 6:
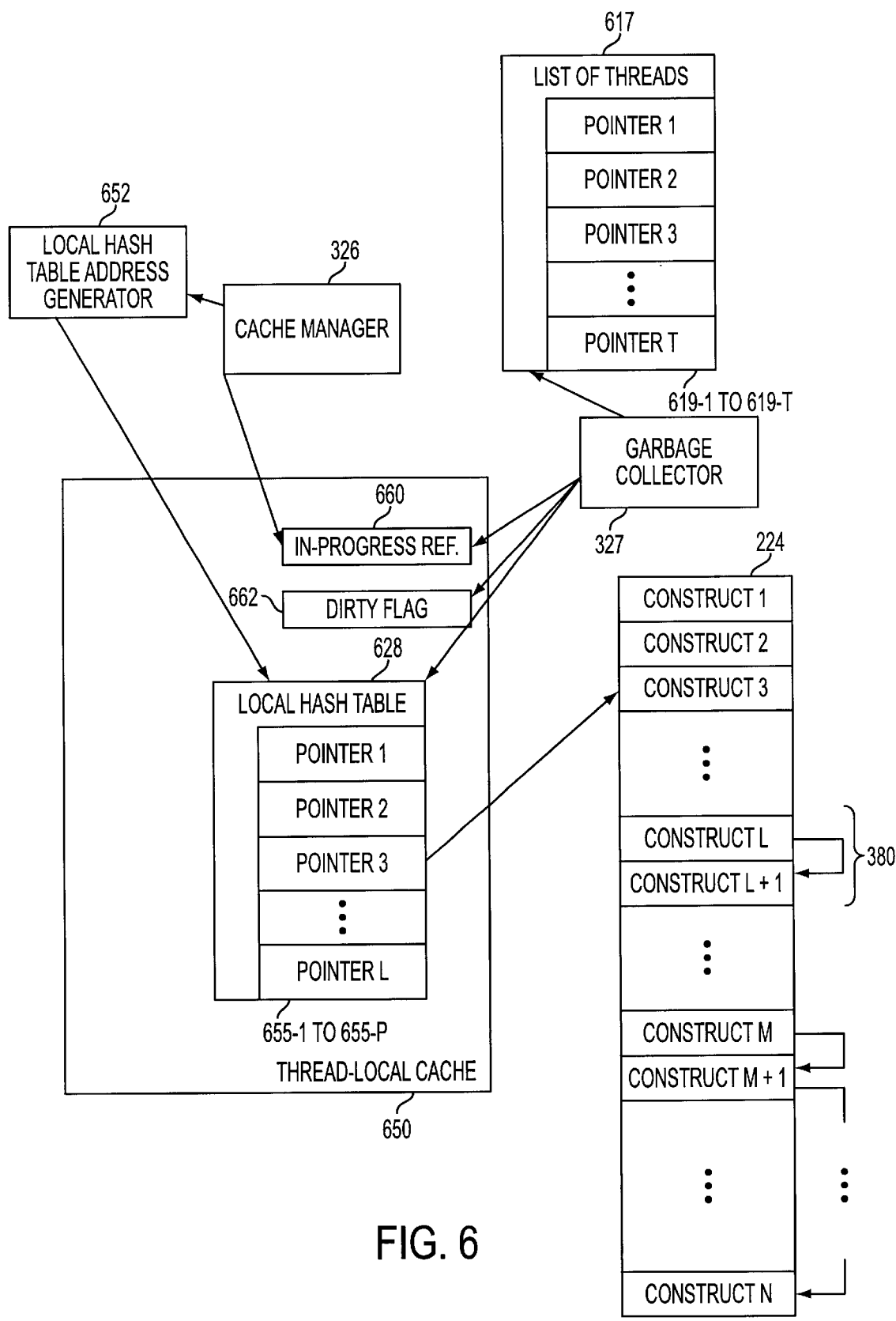
FIG. 6 is a block diagram showing data structures in the local thread cache assigned to a thread.

In an alternate embodiment of an invention, a data structure referred to as a thread-local synchronization construct cache is assigned to each thread 216. A thread-local synchronization construct cache is herein referred to as a thread-local cache. The thread-local cache assigned to a thread contains information used to refer to some of the synchronization constructs currently associated with an object. A thread-local cache is a data structure assigned to each thread for its private use. FIG. 6 shows the data structures that are part of a thread-local cache of one of threads 216. One advantage of using a thread-local cache is that data structures that are part of a thread-local cache need not be locked before the thread accesses the data structure. Thus, overhead and contention delays incurred in locking data structures are avoided.

Referring to FIG. 6, thread-local cache 650 contains local hash table 628, which contains set of pointers 655. Each pointer is at a local hash table address. The set of pointers 655 are initially null when a thread-local cache is first assigned to a thread. Local hash table address generator 652 maps (or hashes) the address in memory 106 of each of the objects 214. This is done by computing a predetermined hash function on the unique IDs of these objects to generate the corresponding local hash table addresses. In order to keep the size of local hash table 628 small in the local thread cache 650 of each of threads 216, the number of pointers in set of pointers 655 may be less than the number of pointers in set of pointers 305. Furthermore, the unique IDs of two or more objects may be mapped by the local hash table function to the same local hash table address. As a result, local hash table collisions may occur.

Referring to FIG. 6, list of current threads 617 contains an entry associated with each of threads 216. Each entry contains a thread-local cache pointer of thread-local cache pointers 619. A thread-local cache pointer from thread-local cache pointers 619 points to the thread-local cache of the thread associated with the entry in the list of current threads containing the thread-local cache pointer. A thread-local cache pointer is used to access data structures that are part of the thread-local cache of the thread associated with the entry in the list of current threads containing the thread-local cache pointer.

In-progress reference 660 is a data structure that contains information identifying one object. Assigning a value to the in-progress reference 660 is an atomic operation. Thus, when a thread begins an operation to assign a value to the in-progress reference 660, the execution of the thread assigning the value cannot be interrupted by the execution of another thread until the completion of the assignment operation. The dirty flag 662 indicates the thread has made a change to local hash table 628 after the garbage collector has modified the local hash table 628.

When the cache manager 326 needs to determine whether a synchronization construct is currently associated with a particular object, the cache manager 326 initially attempts to use the information contained in local hash table 628. Typically, the need to determine whether a synchronization construct is associated with a particular object arises when, for example, object synchronization module 300 performs the steps to synchronize a thread with a particular object. When object synchronization module 300 receives a request to synchronize a given thread with a particular object, object synchronization module 300 assigns the unique ID to in-progress reference 660 to identify the particular object. As shall be described in further detail, assigning a value identifying an object to the in-progress reference 660 indicates that the thread has begun to access the synchronization construct associated with the identified object.

Next the cache manager 326 invokes the local hash table address generator 652 to generate the local hash table address to which the particular object's unique ID is mapped. The local hash table address 652 generator generates the local hash table address by computing the predetermined local hash function on the unique ID. The cache manager 326 then determines whether the pointer at the local hash table address to which the particular object's unique ID is mapped points to a synchronization construct currently associated with the particular object. The cache manager 326 makes this determination by accessing the synchronization construct pointed to by the pointer at the local hash table address to find the object identifier of the synchronization construct, and compares the object identifier to the unique ID of the particular object. If the object identifier matches the unique ID of the particular object, the synchronization construct pointed to by the pointer at the local hash table address is associated with the particular object.

If the determination is that the pointer at the local hash table address does not point to a synchronization construct associated with the particular object, in-progress reference 660 is blanked out so that the in-progress reference 660 no longer identifies any object. The in-progress reference 660 may be blanked out by, for example, assigning zero or null to in-progress reference 660. Then cache manager 326 uses the global hash table 338 to determine which particular synchronization construct, if any, is associated with the particular object in the manner previously described. If no synchronization construct is currently associated with the particular object, an association is established between the synchronization construct and the object, and the object synchronization module goes onto perform the desired operations in the manner described before.

After the object synchronization module 300 performs the desired operations, the object synchronization module 300 sets the pointer at the local hash table address previously generated for the particular object to point to the synchronization construct associated with the particular object. Object synchronization module 300 then sets the dirty flag 662 in the thread-local cache 650 assigned to the thread to indicate that the local hash table 628 has been modified (i.e. is dirty), and the in-progress reference 660 is blanked out.

If in response to the thread requesting synchronization with the particular object, cache manager 326 determines that the pointer at the local hash table address mapped to the particular object's unique ID does refer to the synchronized construct associated with the particular object, then object synchronization module 300 performs the operations described previously. The in-progress reference is then blanked-out.

Because the unique ID of two or more objects can hash to the same local hash table address, a pointer to a first synchronization construct that is stored at a local hash table address may be overwritten when adding the pointer to a second synchronization construct at the same local hash table address. Thus, the local cache may only contain a subset of those synchronization constructs associated with objects in the global cache. The overwriting will not cause any errors because the cache manager 326 verifies, when using a pointer in the local hash table to look up a synchronization construct, that the synchronization construct is associated with the concerned object. In any case, if a look-up of a synchronization construct referred to by pointer in a local hash table does not find an association with the concerned object, then the global hash table 328 is used to determine which synchronization construct is associated with the object, if any.

When de-synchronizing a thread, the local hash table 628 is used in the same manner previously described. The object synchronization module 300 begins by first assigning a value to in-progress reference 760 to identify the particular object. In step 414, the cache manager then determines whether the pointer at the local hash table address that maps to the particular object's unique ID refers to the synchronization construct associated with the particular object. If the pointer at the local hash table address mapped to the particular object's unique ID does point to the synchronization construct associated with the particular object, then execution of the steps proceeds to step 420. Execution at the steps in FIG. 4 proceeds as before except that the in-progress reference 660 is blanked out before execution of the steps ends.

If on the other hand the pointer at the local hash table address mapped to the particular object's unique ID does not point to a synchronization construct associated with the particular object, then the in-progress reference 660 is blanked out. The cache manager 326 falls back to the global hash table 338 to lookup the synchronization construct. If it is found there, execution continues as in step 420.

GARBAGE COLLECTION WITH THREAD-LOCAL CACHE

A thread's local view of the state of the global data structures is based on the local data structures that are part of the thread's thread-local cache. As mentioned earlier, because the unique ID of two or more objects can hash to the same local hash table, a pointer to a first synchronization construct at a local hash table address may be overwritten when adding a pointer to a second synchronization construct to the local hash table as the same local hash table address. This overwriting is one reason that makes the view maintained in the local hash table of the global data structures partial.

Although the view maintained by the local hash table is partial, the view is kept consistent by coordinating the view maintained in the local hash table with the synchronization construct cache in the manner described herein. When a synchronization construct is referred to by the pointer at a local hash table address, the actions of the garbage collector guarantee that the synchronization construct is indeed associated with an object and is not free. If synchronization construct's association with an object is terminated, all references to the synchronization construct in any local hash table are deleted.

Note that a correct view of the global data structures is maintained when a pointer in local hash table 628 is set to not to point to any synchronization construct. Setting a pointer to not point to any synchronization construct will cause the cache manager to fall back to using global hash table 328 to access a synchronization construct.

Figure 7:
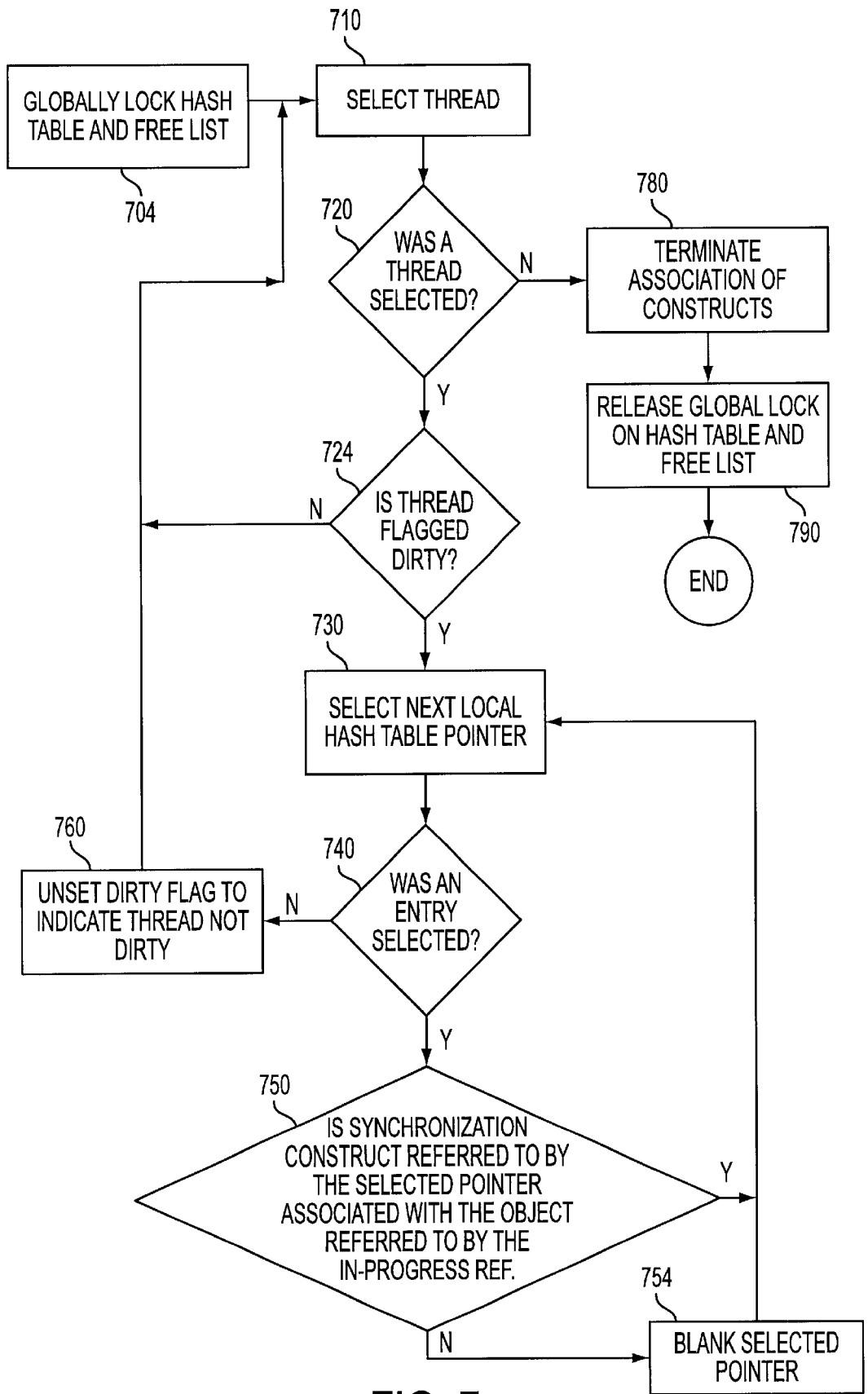
FIG. 7 is a flow chart showing a method to terminate associations between objects with synchronization constructs in an alternate embodiment of the invention using local thread cache.

One method for performing garbage collection when the thread-local cache of a thread is used to access synchronization constructs in the manner previously described is shown in FIG. 7. Referring to FIG. 7, the garbage collector 327 globally locks global hash table 328 and the free list 330 (step 704). Garbage collector 327 then selects a thread (step 710 of FIG. 7) by iterating through the entries in the list of current threads 216. Garbage collector 327 then determines whether a thread was selected. If a thread was not selected, then each thread as been iterated through. The garbage collector then terminates the association of the synchronization constructs with objects that meet the termination criteria. The termination of the association of synchronization constructs with objects is performed in a manner which shall be described in further detail.

If a thread was selected, the garbage collector 327 then determines whether the thread-local cache of the thread has been flagged as dirty (step 724 of FIG. 7). If the thread-local cache of the thread has not been flagged as dirty, then the selected thread has not modified its local hash table (e.g. by entering a new pointer to a synchronization construct) since the last invocation of garbage collector 327. Therefore, there is no new pointer for the garbage collector to set to not point, and the thread-local cache for this particular thread may thus be ignored. Garbage collector 327 determines whether the thread-local cache of the thread has been flagged as dirty by accessing the dirty flag 662 using the thread-local cache pointer contained in the entry associated with the selected thread, and then examining the value stored in the dirty flag 662. If the dirty flag 662 is set to a value indicating that that the thread-local cache of the thread is not dirty, then garbage collector 327 selects another thread (step 710 of FIG. 7).

If the determination made is that the thread-local cache of the selected thread is dirty, then the garbage collector 327 accesses the local hash table of the threadlocal cache for the selected thread to select the next non-null pointer (next pointer) in the local hash table (step 730 of FIG. 7), starting with the pointer at the first local hash table address. Then garbage collector 327 determines whether a pointer was selected for the local hash table 628 (step 740 of FIG. 7). If none was selected, then garbage collector 327 has iterated through all the pointers. Garbage collector 327 then sets dirty flag 662 to a value indicating that the thread-local cache of this thread is not dirty (step 760 of FIG. 7).

If garbage collector 327 determines that a next pointer in local hash table 328 was selected, then garbage collector 327 determines whether the synchronization construct pointed to by the selected pointer is associated with the same object identified by in-progress reference 660. If the synchronization construct pointed to by the selected pointer is not associated with the same object identified by in-progress reference 660, then garbage collector 327 blanks out the selected pointer to not point to a synchronization construct (step 754 in FIG. 7). If the synchronization construct pointed to by the selected pointer is associated with the same object identified by in-progress reference 660, then the selected thread could be in the process of accessing the synchronization construct using the thread's thread-local cache, which as mentioned previously, does not need to be locked.

The in-progress reference is used to protect the integrity of the thread-local cache in the face of a race condition between two threads, one attempting to look up a synchronization construct, and another attempting to garbage collect the synchronization construct. This condition could occur in the way described below. As shall be explained in further detail, the termination criteria is expanded to include the criterion that no in-progress reference associated with any thread be set to identify the object associated with the concerned synchronization construct.

To illustrate one way the use of the in-progress reference protects the integrity of the thread-local cache in the face of a race condition, assume the selected thread is requesting synchronization with an object, and that the selected thread has determined that a synchronization construct referred to by a pointer in the local hash table is associated with the object. After this determination is made but before the thread has been able to synchronize with the object and establish itself as an owner, or establish itself as a waiter, the execution of the selected thread may be suspended by computer system 100, as occurs in multithreaded environments, to permit another thread to execute. The other thread could experience a collection enabling condition and then invoke the garbage collector 327, which, except for the fact the termination criteria is now based on the in-progress reference, may terminate the association of the synchronization construct with the object. The garbage collector would have done so because it had determined that, except for the in-progress reference being set to refer to the object, the synchronization construct meets the termination criteria. When the selected thread begins to execute again, it would operate under the erroneous view that the synchronization construct is still associated with the identified object, despite the fact the synchronization construct might now be free or associated with some other object.

Once every thread has been selected (i.e. has been iterated through) as determined in step 720 of FIG. 7, garbage collector 327 terminates the association of synchronization constructs with objects that meet the termination criteria (step 780 in FIG. 7) as previously described. As mentioned earlier, the termination criteria includes that the object associated with the synchronization construct not be referred to by the in-progress reference associated with any thread. Finally, the garbage collector releases its global lock on global hash table 328 and free list 330 (step 790 in FIG. 7).

Note that unless the local hash table pointer to a synchronization construct refers to the synchronization construct associated with the object referred to by the in-progress reference, the pointer is blanked out regardless of whether the synchronization construct is freed by the garbage collector (i.e. does or does not meet association termination criteria). The present invention is not limited to methods which blank out a particular pointer at a local hash table address regardless of whether the synchronization construct referred to by the particular pointer will be freed by the garbage collector.

One alternative approach, the "selective" approach, involves blanking out only pointers in the local hash table that point to synchronization constructs that will be freed. By retaining the pointers that point to synchronization constructs that will not be freed, falling back to the global hash table occurs less often. The selective approach entails making a determination, when blanking out the local hash table pointers, of which synchronization constructs will be freed by the garbage collector. In circumstances where making this determination is less expensive in terms of computer resources than falling back to the global hash table more often, it may be desirable to use the "selective method".

While one method of managing hash table collisions for the local hash table have been described, various alternative hash table collision mechanisms are possible. Therefore, it is understood that the present invention is not limited to any specific hash table collision mechanism. For example, a local chain of constructs can be maintained for each local hash table address in a manner similar to that described for the global hash table, except that the local chain of constructs would be limited to a pre-determined number of elements. Even when the number of elements in the local chain of constructs is limited, reversion to the global hash table will nevertheless occur less often. It may be desirable to use local chains of constructs if maintaining the local chains of constructs requires less computer resources than falling back to the global hash table more often.

In other embodiments, the methods for accessing a synchronization construct using a thread-local cache in the course of synchronizing or de-synchronizing are applied to other operations where the need to access a synchronization construct arises. For example, when the synchronization construct is a monitor, wait and notify operations are performed on the synchronization construct. The determination of which synchronization construct is associated with the concerned object are performed in manner similar to that described for synchronizing and de-synchronizing.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. In a computer system that includes a plurality of threads and a set of objects that can each be synchronized with one or more of the threads from said plurality of threads, a method of synchronizing one of the objects from the set of objects with one or more of the threads from said plurality of threads, the method comprising the steps of:

requesting synchronization of a first thread from said plurality of threads with a first object from said set of objects;

determining whether a synchronization construct from a cache of synchronization constructs is associated with said first object;

in response to determining that a particular synchronization construct is associated with said first object, using said particular synchronization construct to synchronize said first thread with said first object; and maintaining an association between said particular synchronization construct and said first object when there is no thread waiting to be synchronized with said first object and no thread synchronized with said first object.

2. The method of claim 1, further including the steps of:

determining whether a condition in a set of garbage collection enabling conditions is satisfied; and in response to determining that said condition in the set of garbage collection enabling conditions is satisfied, performing the steps of:

selecting a synchronization construct from one or more associated synchronization constructs, each associated synchronization construct being associated with an object, determining whether each criterion in a set of association termination criteria is satisfied, where said set of association termination criterion indicates criteria for terminating associations between objects and synchronization constructs, and in response to determining that each criterion in the set of association termination criteria is satisfied, terminating the association between said selected synchronization construct and said object associated with said selected synchronization construct.

3. The method of claim 2, wherein the set of collection enabling conditions includes a number of synchronization constructs not associated with any object being less than or equal to a threshold number.

4. The method of claim 2, the method further including the step of providing a thread-local cache assigned to each thread, wherein data in said thread-local cache assigned to a particular thread contains information referring to a synchronization construct currently associated with some object.

5. The method of claim 4, wherein the step of determining whether a synchronization construct from said cache of synchronization constructs is associated with said first object further includes using the data contained in said thread-local cache to access the synchronization construct referred to by information contained in said particular entry.

6. The method of claim 4, wherein:

an in-progress reference is associated with each thread from said plurality of threads;

the step of determining whether a synchronization construct from said cache of synchronization constructs is associated with said first object further includes storing information in the in-progress reference associated with said first thread indicating an identity of said first object; and the method further includes the steps of:

storing information in said in-progress reference associated with said first thread indicating no identity of an object, and the association termination criteria further includes no in-progress reference associated with each thread from said plurality of threads containing information identifying said first object.

7. The method of claim 1, wherein the step of maintaining an association includes maintaining said association between said particular synchronization construct and said first object until processed during a garbage collection operation.

8. In a computer system that includes a plurality of threads and a set of objects that can each be synchronized with one or more of the threads from said plurality of threads, a method of synchronizing one of the objects from the set of objects with one or more of the threads from said plurality of threads, the method comprising the steps of:

associating one or more synchronization constructs with one or more objects from the set of objects when one or more threads from the plurality of threads requests synchronization with said one or more objects from the set the objects;

determining whether a condition in a set of garbage collection enabling conditions is satisfied; and in response to determining that said condition in the set of garbage collection enabling conditions is satisfied, performing the steps of:

selecting a synchronization construct from one or more associated synchronization constructs, each associated synchronization construct being associated with an object, determining whether each criterion in a set of association termination criteria is satisfied, wherein said set of association termination criterion indicates criteria for terminating associations between objects and synchronization constructs, and in response to determining that each criterion in the set of association termination criteria is satisfied, terminating the association between said selected synchronization construct and said object associated with said selected synchronization construct.

9. The method of claim 8, wherein the set of collection enabling conditions includes the number of synchronization constructs not associated with any object being less than or equal to a threshold number.

10. The method of claim 8, wherein the set of association termination criteria includes no thread being synchronized with said object associated with said selected synchronization construct.

11. A computer readable medium having stored thereon a plurality of sequences of instructions, the plurality of sequences of instructions including sequences which, when executed by a processor, cause said processor to perform the steps of:

requesting synchronization of a first thread from a plurality of threads with a first object from a set of objects;

determining whether a synchronization construct from a cache of synchronization constructs is associated with said first object;

in response to determining that a particular synchronization construct is associated with said first object, using said particular synchronization construct to synchronize said first thread with said first object; and maintaining an association between said particular synchronization construct and said first object when there is no thread waiting to be synchronized with said first object and no thread synchronized with said first object.

12. The computer readable medium of claim 11, further comprising sequences of instructions for performing the steps of:

determining whether a condition in a set of garbage collection enabling conditions is satisfied; and in response to determining that said condition in the set of garbage collection enabling conditions is satisfied, performing the steps of:

selecting a synchronization construct from one or more associated synchronization constructs, each associated synchronization construct being associated with an object, determining whether each criterion in a set of association termination criteria is satisfied, wherein said set of association termination criterion indicates criteria for terminating associations between objects and synchronization constructs, and in response to determining that each criterion in the set of association termination criteria is satisfied, terminating the association between said selected synchronization construct and said object associated with said selected synchronization construct.

13. The computer readable medium of claim 12, wherein the set of collection enabling conditions includes the number of synchronization constructs not assigned with any object being less than or equal to a threshold number.

14. The computer readable medium of claim 11, further comprising sequences of instructions for performing the steps of providing a thread-local cache assigned to each thread, wherein data in said thread-local cache assigned to a particular thread contains information referring to a synchronization construct currently associated with some object.

15. The computer readable medium of claim 14, wherein the step of determining whether a synchronization construct from said cache of synchronization constructs is associated with said first object further includes using the data in said thread-local cache to access the synchronization construct referred to by information contained in said particular entry.

16. The computer readable medium of claim 14, wherein:

an in-progress reference is associated with each thread from said plurality of threads;

the step of determining whether a synchronization construct from said cache of synchronization constructs is associated with said first object further includes storing information in the in-progress reference associated with said first thread indicating an identity of said first object;

the computer readable medium further comprising sequences of instructions for performing the step of storing information in said in-progress reference associated with said first thread indicating no identity of an object; and the association termination criteria further including no in-progress reference associated with each thread from said plurality of threads containing information identifying said first object.

17. A computer readable medium having stored thereon a plurality of sequences of instructions, the plurality of sequences of instructions including sequences which, when executed by a processor, cause said processor to perform the steps of:

providing a cache of synchronization constructs;

associating one or more synchronization constructs with one or more objects from a set of objects when one or more threads from a plurality of threads requests synchronization with said one or more objects from the set the objects;

determining whether a condition in a set of garbage collection enabling conditions is satisfied; and in response to determining that said condition in the set of garbage collection enabling conditions is satisfied, performing the steps of:

selecting a synchronization construct from one or more associated synchronization constructs, each associated synchronization construct being associated with an object, determining whether each criterion in a set of association termination criteria is satisfied, wherein said set of association termination criterion indicates criteria for terminating associations between objects and synchronization constructs, and in response to determining that each criterion in the set of association termination criteria is satisfied, terminating the association between said selected synchronization construct and said object associated with said selected synchronization construct.

18. The computer readable medium of claim 17, wherein the set of collection enabling conditions includes the number of synchronization constructs not associated with any object being less than or equal to a threshold number.

19. A computer system comprising:
a processor, wherein said processor is executing a plurality of threads;
a memory coupled to said processor;
said memory having stored therein a cache of synchronization constructs;
said processor being configured to request a synchronization of a first thread from said plurality of threads with a first object from a set of objects;
said processor being configured to determine whether a synchronization construct from said cache of synchronization constructs is associated with said first object;
said processor being configured to respond to determining that a particular synchronization construct is associated with said first object by using said particular synchronization construct to synchronize said first thread with said first object; and
said processor being configured to maintain an association between said particular synchronization construct and said first object when there is no thread waiting to be synchronized with said first object and no thread synchronized with said first object.

20. The computer system of claim 19, further comprising:
said processor being configured to determine whether a condition in a set of garbage collection enabling conditions is satisfied; and
said processor being configured to respond to determining that said condition in the set of garbage collection enabling conditions is satisfied, by performing the steps of:
selecting a synchronization construct from one or more associated synchronization constructs, each associated synchronization construct being associated with an object,
determining whether each criterion in a set of association termination criteria is satisfied, wherein said set of association termination criterion indicates criteria for terminating associations between objects and synchronization constructs, and
in response to determining that each criterion in the set of association termination criteria is satisfied, terminating the association between said selected synchronization construct and said object associated with said selected synchronization construct.

21. A computer system comprising:
a processor, wherein said processor is executing a plurality of threads;
a memory coupled to said processor; and
said memory having stored therein a cache of synchronization constructs;
said processor being configured to associate one or more synchronization constructs with one or more objects from a set of objects when one of more threads from said plurality of threads requests synchronization with said one or more objects from the set the objects;
said processor being configured to determine whether a condition in a set of garbage collection enabling conditions is satisfied; and
said processor being configured to respond to determining that said condition in the set of garbage collection enabling conditions is satisfied, by performing the steps of:
selecting a synchronization construct from one or more associated synchronization constructs, each associated synchronization construct being associated with an object,
determining whether each criterion in a set of association termination criteria is satisfied, wherein said set of association termination criterion indicates criteria for terminating associations between objects and synchronization constructs;
in response to determining that each criterion in the set of association termination criteria is satisfied, terminating the association between said selected synchronization construct and said object associated with said selected synchronization construct.

22. Sequences of instructions embodied in a carrier wave, the sequences of instructions including sequences of instructions which, when executed by a processor, cause said processor to perform the steps of:
requesting synchronization of a first thread from a plurality of threads with a first object from a set of objects;
determining whether a synchronization construct from a cache of synchronization constructs is associated with said first object;
in response to determining that a particular synchronization construct is associated with said first object, using said particular synchronization construct to synchronize said first thread with said first object; and
maintaining an association between said particular synchronization construct and said first object when there is no thread waiting to be synchronized with said first object and no thread synchronized with said first object.

23. The sequences of instructions of claim 22, further comprising sequences of instructions for performing the steps of:
determining whether a condition in a set of garbage collection enabling conditions is satisfied; and
in response to determining that said condition in the set of garbage collection enabling conditions is satisfied, performing the steps of:
selecting a synchronization construct from one or more associated synchronization constructs, each associated synchronization construct being associated with an object,
determining whether each criterion in a set of association termination criteria is satisfied, wherein said set of association termination criterion indicates criteria for terminating associations between objects and synchronization constructs, and
in response to determining that each criterion in the set of association termination criteria is satisfied, terminating the association between said selected synchronization construct and said object associated with said selected synchronization construct.

24. The sequences of instructions of claim 23, wherein the set of collection enabling conditions includes the number of synchronization constructs not assigned with any object being less than or equal to a threshold number.

25. The sequences of instructions of claim 23, further comprising sequences of instructions for performing the steps of providing a thread-local cache assigned to each thread, wherein data in said thread-local cache assigned to a particular thread contains information referring to a synchronization construct currently associated with some object.

26. The sequences of instructions of claim 25, wherein the step of determining whether a synchronization construct from said cache of synchronization constructs is associated with said first object further includes using information contained in a particular entry in said thread-local cache to access the synchronization construct referred to by information contained in said particular entry.

27. The sequences of instructions of claim 25, wherein:
an in-progress reference is associated with each thread from said plurality of threads;
the step of determining whether a synchronization construct from said cache of synchronization constructs is associated with said first object further includes storing information in the in-progress reference associated with said first thread indicating an identity of said first object;
the sequences of instructions further comprising sequences of instructions for performing the step of storing information in said in-progress reference associated with said first thread indicating no identity of an object; and
the association termination criteria further including no in-progress reference associated with each thread from said plurality of threads containing information identifying said first object.

28. Sequences of instructions embodied in a carrier wave, the sequences of instructions including sequences which, when executed by a processor, cause said processor to perform the steps of:
associating one or more synchronization constructs with one or more objects from the set of objects when one or more threads from the plurality of threads requests synchronization with said one or more objects from the set the objects;
determining whether a condition in a set of garbage collection enabling conditions is satisfied; and
in response to determining that said condition in the set of garbage collection enabling conditions is satisfied, performing the steps of:
selecting a synchronization construct from one or more associated synchronization constructs, each associated synchronization construct being associated with an object,
determining whether each criterion in a set of association termination criteria is satisfied, wherein said set of association termination criterion indicates criteria for terminating associations between objects and synchronization constructs, and
in response to determining that each criterion in the set of association termination criteria is satisfied, terminating the association between said selected synchronization construct and said object associated with said selected synchronization construct.

29. The sequences of instructions of claim 28, wherein the set of collection enabling conditions includes the number of synchronization constructs not associated with any object being less than or equal to a threshold number.

\* \* \* \* \*

UNITED STATES PATENT AND TRADEMARK OFFICE
CERTIFICATE OF CORRECTION

PATENT NO. : 6,345,313 B1
DATED : February 5, 2002
INVENTOR(S) : Timothy G. Lindholm It is certified that error appears in the above-identified patent and that said Letters Patent is hereby corrected as shown below:

Column 20,
Line 6, change "where" to -- wherein --;

Column 22,
Line 1, change "11" to -- 12 --.

Signed and Sealed this

Third Day of September, 2002

Attest:

Attesting Officer

JAMES E. ROGAN
Director of the United States Patent and Trademark Office